US010040702B2

(12) United States Patent
Wilson

(10) Patent No.: US 10,040,702 B2
(45) Date of Patent: Aug. 7, 2018

(54) SYSTEMS FOR ISOTOPIC WATER SEPARATION

(71) Applicant: ENERGYSOLUTIONS, INC., Salt Lake City, UT (US)

(72) Inventor: James H. Wilson, Murrells Inlet, SC (US)

(73) Assignee: EnergySolutions, Inc., Salt Lake City, UT (US)

( * ) Notice: Subject to any disclaimer, the term of this patent is extended or adjusted under 35 U.S.C. 154(b) by 0 days.

(21) Appl. No.: 14/796,766

(22) Filed: Jul. 10, 2015

(65) Prior Publication Data

US 2015/0306524 A1 Oct. 29, 2015

Related U.S. Application Data

(62) Division of application No. 14/463,406, filed on Aug. 19, 2014, now Pat. No. 9,266,750.

(Continued)

(51) Int. Cl.
*B01D 29/56* (2006.01)
*C02F 1/04* (2006.01)
(Continued)

(52) U.S. Cl.
CPC ............... *C02F 1/44* (2013.01); *B01D 29/56* (2013.01); *B01D 59/14* (2013.01); *B01D 63/082* (2013.01); *B01D 71/021* (2013.01); *B01D 71/024* (2013.01); *C02F 1/001* (2013.01); *C02F 1/04* (2013.01); *C02F 1/048* (2013.01); *G21F 9/06* (2013.01); *B01D 2311/25* (2013.01);

(Continued)

(58) Field of Classification Search
None
See application file for complete search history.

(56) References Cited

U.S. PATENT DOCUMENTS 2,999,795 A * 9/1961 Yagi ......................... C01B 5/02
159/1.1
3,457,171 A * 7/1969 Flowers ............. B01D 67/0004
138/125

(Continued)

FOREIGN PATENT DOCUMENTS

WO WO 2012170086 A1 12/2012
WO WO 2014027197 A1 2/2014
WO WO 2014204711 A2 12/2014

OTHER PUBLICATIONS

Nair, et al. "Unimpeded permeation of water through helium-leak-tight graphene-based membranes." Science, 335, Jan. 27, 2012, p. 442-445.*

(Continued)

*Primary Examiner* — Krishnan S Menon
*Assistant Examiner* — Ryan B Huang
(74) *Attorney, Agent, or Firm* — Holland & Hart, LLP

(57) ABSTRACT

Systems for filtering water according to its isotopic forms. In some embodiments, a stream of water, such as a waste stream of water from a nuclear power plant, comprising at least two distinct isotopic forms of water may be directed into one or more filtration modules comprising a graphene oxide membrane. The graphene oxide membrane(s) may be used to separate the stream into a permeate and a retentate, wherein the permeate comprises an increased concentration of light water relative to the retentate.

22 Claims, 3 Drawing Sheets

Related U.S. Application Data

(60) Provisional application No. 61/869,568, filed on Aug. 23, 2013.

(51) Int. Cl.

| | | |
|---|---|---|
| *C02F 1/00* | (2006.01) | |
| *C02F 1/44* | (2006.01) | |
| *G21F 9/06* | (2006.01) | |
| *B01D 71/02* | (2006.01) | |
| *B01D 63/08* | (2006.01) | |
| *B01D 59/14* | (2006.01) | |
| *C02F 101/00* | (2006.01) | |
| *C02F 101/10* | (2006.01) | |
| *C02F 103/34* | (2006.01) | |

(52) U.S. Cl.
CPC .... *B01D 2317/02* (2013.01); *B01D 2317/025* (2013.01); *C02F 1/041* (2013.01); *C02F 2101/006* (2013.01); *C02F 2101/10* (2013.01); *C02F 2103/34* (2013.01); *C02F 2301/08* (2013.01)

(56) References Cited

U.S. PATENT DOCUMENTS

| 5,451,322 | A | 9/1995 | Nelson et al. | |
|---|---|---|---|---|
| 6,348,153 | B1 | 2/2002 | Patterson et al. | |
| 6,375,803 | B1* | 4/2002 | Razzaghi | B01D 1/2856 |
| | | | | 159/24.1 |
| 6,517,708 | B1 | 2/2003 | Patterson et al. | |
| 6,602,418 | B2 | 8/2003 | Peterson et al. | |
| 8,361,321 | B2 | 1/2013 | Stetson et al. | |
| 2006/0070955 | A1* | 4/2006 | Rabins | B01D 15/1828 |
| | | | | 210/659 |
| 2010/0239481 | A1 | 9/2010 | Busigin | |
| 2012/0048804 | A1* | 3/2012 | Stetson | B01D 61/02 |
| | | | | 210/653 |
| 2012/0111052 | A1* | 5/2012 | Szivacz | B01D 53/226 |
| | | | | 62/619 |
| 2012/0255899 | A1* | 10/2012 | Choi | B01D 53/228 |
| | | | | 210/489 |
| 2013/0156678 | A1 | 6/2013 | Banerjee et al. | |
| 2013/0192460 | A1* | 8/2013 | Miller | B01D 53/22 |
| | | | | 95/47 |
| 2013/0213902 | A1* | 8/2013 | Browne | C02F 1/281 |
| | | | | 210/767 |
| 2013/0270188 | A1* | 10/2013 | Karnik | B01D 53/228 |
| | | | | 210/650 |
| 2013/0330833 | A1* | 12/2013 | Ruiz | B01D 39/00 |
| | | | | 436/174 |
| 2014/0147648 | A1 | 5/2014 | Zhamu et al. | |
| 2014/0318373 | A1* | 10/2014 | Wood | B01D 71/06 |
| | | | | 96/11 |

OTHER PUBLICATIONS

Duncan, Separation of Tritiated Water from Water Using Composite Membranes, Report, ESP Technical Exchange Meeting, Gaithersburg, Maryland, Dec. 1995.

Lockheed Martin, Lockheed Martin Achieves Patent for Perforene Filtration Solution, Moves Closer to Affordable Water Desalination, Newsletter, Water Online, Mar. 18, 2013.

Nair, Unimpeded Permeation of Water Through Helium-Leak-Tight Graphene-Based Membranes, Magazine, Published Jan. 27, 2012, Science vol. 335, 442 (2012).

Dreyer, The Chemistry of Graphine Oxide, Chemical Society Reviews, 2010, vol. 39, 228-240, Nov. 3, 2009.

NanoNuclear 2012—Collaborative Report on the Workshop, The Minerals, Metals & Materials Society, Gaithersburg, Maryland, Jun. 6, 2012.

Shahriary, Graphene Oxide Synthesized by using Modified Hummer Approach, International Journal of Renewable Energy and Environmental Engineering, ISSN 2348-0157, vol. 2, No. 1, Jan. 2014.

Sevigny, GJ. et al. "Separation of Tritiated Water Using Graphene Oxide Membrane". Fuel Cycle Research & Development. Pacific Northwest National Laboratory, Jun. 2015.

PCT International Search Report for PCT International Application No. PCT/US16/19931, dated Jun. 3, 2016 (2 pp.).

Hankel, M., et al., Asymmetrically Decorated, Doped Porous Graphene as an Effective membrane for Hydrogen Isotope Separation, The Journal of Physical Chemistry, vol. 116, pp. 6672-6676, Feb. 21, 2012 (5 pp.).

Information about Related Patents and Patent Applications.

U.S. Pat. No. 9,266,750, Feb. 23, 2016, Wilson, Systems and Methods for Isotopic Water Separation, U.S. Appl. No. 14/463,406, filed Aug. 19, 2014.

U.S. Pat. No. 9,475,007, Oct. 25, 2016, Wilson, Methods Relating to Isotopic Water Filtration, U.S. Appl. No. 14/632,844, filed Feb. 26, 2015.

US-2017/0036166, Jan. 9, 2017, Wilson, Methods Relating to Isotopic Water Filtration, U.S. Appl. No. 15/331,634, filed Oct. 21, 2016.

\* cited by examiner

SYSTEMS FOR ISOTOPIC WATER SEPARATION

RELATED APPLICATIONS

This application is a divisional of copending U.S. patent application Ser. No. 14/463,406, filed on Aug. 19, 2014 and titled "SYSTEMS AND METHODS FOR ISOTOPIC WATER SEPARATION," which claims the benefit under 35 U.S.C. § 119(e) of U.S. Provisional Patent Application No. 61/869,568 filed Aug. 23, 2013 and titled "SYSTEMS AND METHODS FOR ISOTOPIC WATER SEPARATION." Both of the aforementioned patent applications are hereby incorporated herein by specific reference in their entireties.

SUMMARY

Disclosed herein are embodiments and implementations of methods and systems for filtering water according to its isotopic forms. For example, in some embodiments and implementations, deuterium oxide and/or tritium oxide may be separated from the more abundant isotopic form of water containing hydrogen atoms having no neutrons. Some embodiments and implementations may be particularly useful in connection with nuclear power plants in which nuclear reactors use heavy water to moderate the nuclear reactions taking place in the reactor(s). Because some of this heavy water becomes tritiated water as the heavy water captures neutrons from the nuclear reactions, and because heavy water must be removed before such water can be returned to the environment, it may be useful to be able to filter or separate the heavy water from one or both of its other isotopic forms.

In one particular example of a method for filtering water from a nuclear power plant according to its isotopic forms, the method may comprise obtaining a waste stream of liquid water from a nuclear power plant. Such streams typically comprise at least two distinct isotopic forms of water (such as tritiated water and light or normal water). In some implementations, the waste stream of liquid water may be heated to form a gas comprising at least two distinct isotopic forms of water.

The gas may then be directed into a filtration module comprising one or more graphene oxide membranes. At least a portion of the gas may be directed into one or more of the graphene oxide membranes, such that the graphene oxide membrane(s) can be used to separate the gas into a permeate and a retentate, wherein the permeate comprises an increased concentration of light water relative to the retentate.

In some implementations, the graphene oxide membrane may comprise a plurality of graphene oxide sheets. In some implementations, the graphene oxide membrane may comprise a thickness of between about 0.1 micrometers and about 10 micrometers. In some such implementations, the graphene oxide membrane may comprise a thickness of between about 0.2 and about 6 micrometers. In some such implementations, the graphene oxide membrane may comprise a thickness of between about 0.3 and about 1 micrometer. In some such implementations, the graphene oxide membrane may comprise a thickness of about 0.5 micrometers.

In some implementations, each of the plurality of graphene oxide sheets is separated from an adjacent graphene oxide sheet by a distance of between about 0.5 nanometers and about 2 nanometers. In some such implementations, the sheets may be laminated so as to be separated from each adjacent sheet by a distance of about 1 nanometer. In some implementations, the sheets may be laminated so as to be separated from each adjacent sheet by a distance of at least about 0.6 nanometers.

In another example of a method for filtering water according to its isotopic forms, the method may comprise directing a stream comprising at least two distinct isotopic forms of water into a filtration module, wherein the filtration module comprises a graphene oxide membrane comprising a plurality of graphene oxide sheets. At least a portion of the stream may be passed through the graphene oxide membrane, which may separate the stream into a permeate and a retentate, wherein the permeate comprises an increased concentration of light water relative to the retentate.

In some implementations, the stream may comprise a waste stream of water from a nuclear power plant.

In some implementations, the permeate may be directed into a second filtration module, and in some such implementations, a plurality of additional filtration modules. Such filtration module(s) may also comprise graphene oxide membranes each comprising a plurality of graphene oxide sheets.

In some implementations, at least a portion of the permeate may be passed through the graphene oxide membrane of the second and/or other filtration module(s), which may result in the permeate being separated into one or more sub-permeates and sub-retentate(s), wherein the sub-permeate(s) comprises an increased concentration of light water relative to the sub-retentate(s). In some implementations, the sub-retentate(s) may be redirected into one or more of the original filtration modules such that at least a portion of the sub-retentate passes through the graphene oxide membrane of the filtration module(s). In this manner, a reflux cascade filtration system may be established.

In some implementations, liquid water comprising at least two distinct isotopic forms of water may be heated to form a gas. In some such implementations, the stream may comprise the gas such that water vapor is passed through the graphene oxide membrane of the filtration module(s). In some such implementations, the step of heating liquid water may comprise use of a mechanical vapor recompression process.

In one particular example of a nuclear power plant filtration system, the system may comprise an intake coupled to a waste stream of water from a nuclear power plant. The waste stream of water may comprise at least two distinct isotopic forms of water, and the waste stream of water may comprise a first concentration of at least one of heavy water and super heavy water. The system may further comprise a plurality of filtration modules, one or more of which is coupled with the intake.

One or more of the plurality of filtration modules may comprise at least one graphene oxide membrane, and one or more of the graphene oxide membranes may comprise a plurality of graphene oxide sheets coupled together in a layered, interlocking structure. At least one of the plurality of filtration modules may be configured to separate the waste stream into a permeate and a retentate, wherein the permeate comprises an increased concentration of light water relative to the retentate. In some embodiments, each of the plurality of filtration modules may comprise at least one graphene oxide membrane, and each of the graphene oxide membranes may comprise a plurality of graphene oxide sheets coupled together in a layered, interlocking structure.

Some embodiments may further comprise an outlet coupled with at least one of the plurality of filtration modules, wherein the outlet is configured to deliver water comprising a second concentration of at least one of heavy water and super heavy water, and wherein the second concentration is lower than the first concentration.

In some embodiments, the second concentration is at least substantially zero. In other words, in some embodiments, the filtration module(s) may be configured to at least substantially eliminate heavy and/or super heavy water from an incoming stream of liquid and/or gaseous water.

In some embodiments, the plurality of filtration modules may comprise a reflux cascade filtration system. In some embodiments, one or more thermal pretreatment modules may be provided to receive liquid water from the waste stream of water and convert the liquid water into gaseous water. The thermal pretreatment module(s) may be coupled with at least one of the plurality of filtration modules, either directly or indirectly. In some embodiments, the thermal pretreatment module(s) may comprise a mechanical vapor recompression module.

Some embodiments may be configured with one or more modules configured to maintain a particular humidity and/or water partial pressure within the system or at least one of the filtration modules of the system. For example, some embodiments may be configured with one or more modules that are configured to maintain a partial pressure of water inside one or more filtration portions of one or more filtration modules of at least about 10 mbar. Some such embodiments may be configured with one or more modules that are configured to maintain a partial pressure of water inside one or more filtration portions of one or more filtration modules of at least about 15 mbar.

In addition, or alternatively, some embodiments may be configured with one or more modules that are configured to maintain a relative humidity within the filtration portion of the module of at least about 20%. Some such embodiments may be configured with one or more modules that are configured to maintain a relative humidity within the filtration portion of the module of at least about 30%. Some such embodiments may be configured with one or more modules that are configured to maintain a relative humidity within the filtration portion of the module of at least about 50%.

In some embodiments, a second outlet may be coupled with at least one of the plurality of filtration modules. The second outlet may be configured to deliver "heavy" water (comprising heavy and/or super heavy water) relative to the first outlet. In other words, the second outlet may be configured to deliver water comprising a third concentration of at least one of heavy water and super heavy water, wherein the third concentration is higher than the first concentration.

The features, structures, steps, or characteristics disclosed herein in connection with one embodiment may be combined in any suitable manner in one or more alternative embodiments.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
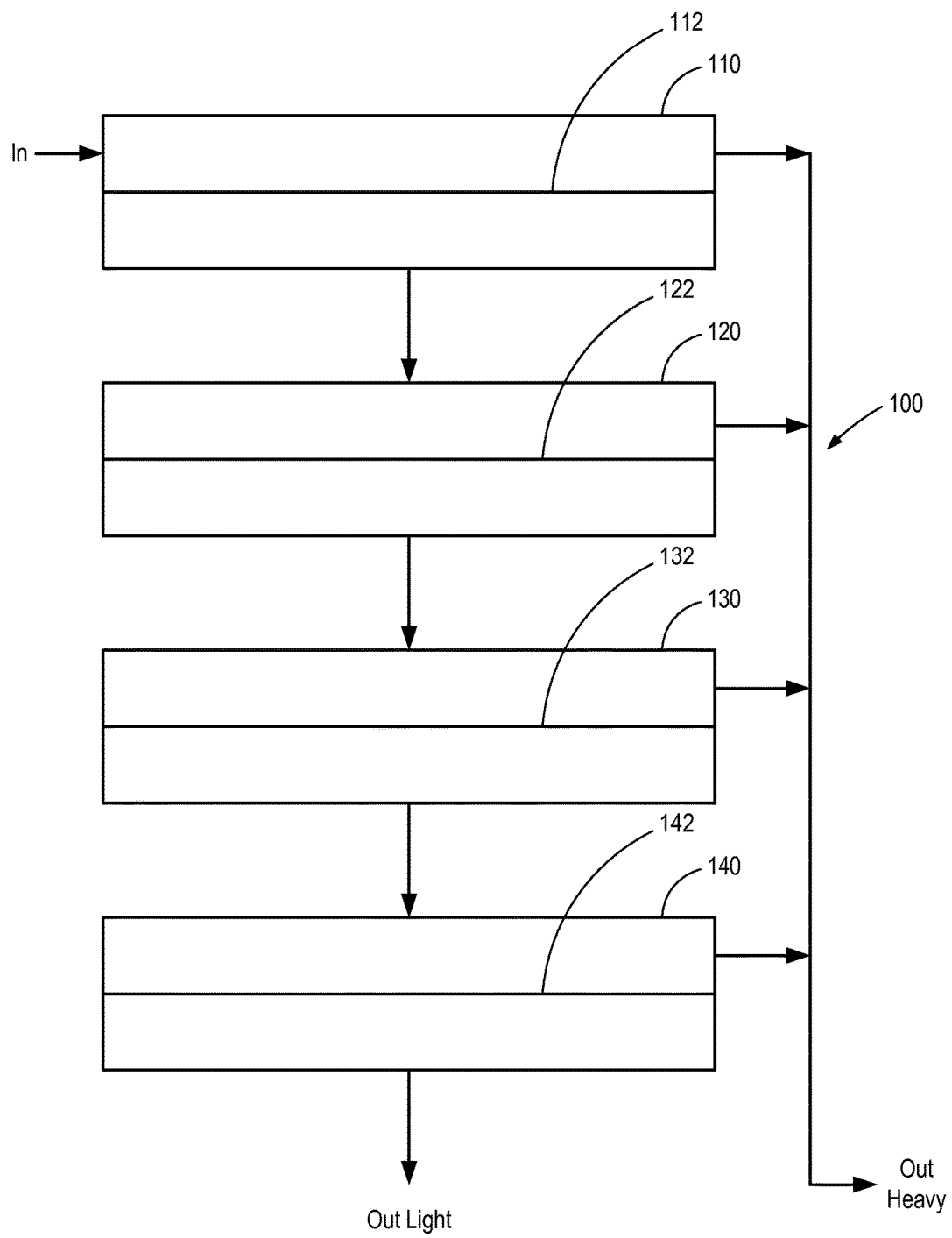
FIG. 1 depicts an embodiment of a system for separating one or more isotopic forms of water from one or more other isotopic forms of water using graphene oxide membranes.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail in order to avoid obscuring aspects of the disclosure. Furthermore, the described features, structures, steps, or characteristics may be combined in any suitable manner in one or more alternative embodiments and/or implementations.

The present disclosure provides various embodiments and implementations of methods and systems for separating one or more isotopic forms of water from one or more other isotopic forms of water. For example, in some embodiments and implementations, deuterium oxide ("heavy water") may be separated from the more abundant isotopic form of water containing hydrogen atoms having no neutrons ("normal" or "light" water). In other embodiments and implementations, tritium oxide ("tritiated water" or "super heavy water") may be separated from normal water. As those of ordinary skill in the art will appreciate, super heavy water in a more diluted form may comprise HTO (3HOH) along with water. In some embodiments and implementations, tritiated water and heavy water may be separated from one another in one or more processes. Alternatively, tritiated water may be separated along with heavy water from light water.

As discussed in greater detail below, the inventive principles disclosed herein may allow for separation of molecules from one another due to a wide variety of different characteristics between the molecules that may be difficult to take advantage of in other filtration processes. For example, although some of the molecular weights of particular molecules that may be separated/filtered in one or more embodiments may differ, in other embodiments, other physical and/or chemical characteristics, such as bond angle and/or bond length, may be used to separate particular molecules.

It is thought that one or more principles, embodiments, and/or implementations discussed herein may be particularly useful in connection with nuclear energy plants. For example, many nuclear reactors use heavy water to moderate the nuclear reactions taking place in the reactor(s). Some of this heavy water becomes tritiated water as the heavy water captures neutrons from the nuclear reactions. Because tritiated water is radioactive, it may be desirable to remove such water from waste streams prior to releasing the water into the environment so as to limit the detrimental impact of tritiated water on living organisms and on the environment more generally. Thus, some embodiments and implementations may be specifically configured to filter or otherwise separate tritiated water from light water in a water waste stream of a nuclear power plant.

Other embodiments and implementations may also, or alternatively, be configured to filter or otherwise separate heavy water from light water. Because heavy water, although not radioactive, may serve useful purposes (such as use as a moderator in a nuclear power plant), some embodiments and implementations may be specifically configured to separate and store heavy water for further use or sale.

Although the preferred embodiments and implementations discussed herein generally relate to the nuclear power industry, it is contemplated that the inventive concepts disclosed herein may be applied to other industries, such as for obtaining heavy and/or super heavy water for use in life science research, spectroscopy, neutrino detection, etc.

In some preferred embodiments and implementations, one or more filtration modules may be employed comprising graphene oxide membranes. Graphene oxide is a graphene sheet that has been interspersed or covered with other molecules, such as hydroxyl groups, epoxy, etc. Graphene oxide may be made, for example, by oxidizing graphite to intersperse the carbon layers with oxygen molecules and then reducing the composition to separate the carbon layers into individual layers.

Certain graphene oxide membranes have been found to be impermeable to liquids, vapors, and gases, with the exception of water. As an example, water permeates through graphene oxide membranes ten orders of magnitude faster than helium. Without being limited by theory, it is thought that this behavior may be attributed to a nearly frictionless flow of a single layer of water through two-dimensional capillaries that are formed by closely-spaced graphene oxide membranes. Permeation of other molecules may be blocked by the water that clogs the capillaries. As compared to the hydrophobic graphene surfaces, these hydrophilic groups in graphene oxide allow water molecules to have a greater number of hydrogen-bonding configurations, thereby increasing water flux.

Considering that the distance between the two-dimensional graphene oxide capillaries is on the order of molecular dimensions, there may be significant differences in the permeation behaviors of light water versus heavy and super heavy water through graphene oxide membranes. These differences may be attributed to the distinct chemical and physical properties of these species. For example, differences in diffusion coefficients, molecular dimensions (bond length and bond angle), molecular mass, moment of inertia, quadrupole moment, and/or viscosity may contribute to distinct permeation behaviors between the various isotopic forms of water.

Without being limited by theory, it is thought that one or more of these properties may be responsible for a higher permeability of light water than heavy water, and an even higher permeability of light water relative to super heavy water, through graphene oxide membranes. Thus, separation of one or more of these isotopic forms of water from one or more other such isotopic forms of water may be achieved by providing one or more filtration units or modules comprising graphene oxide membranes.

Graphene oxide membranes tend to allow for a single layer of light water molecules that can slide along the surface of the membrane with little to no friction. When other atoms or molecules attempt to pass through a graphene oxide membrane in a similar manner, they tend to be blocked by the presence of the layer of light water molecules. Again, without being limited by theory, it is thought that, due to the distinct physical and chemical characteristics of heavy water and super heavy water relative to light water, heavy water and/or super heavy water may similarly be impeded by the presence of light water within the graphene oxide membranes.

In some embodiments and implementations, enhanced separation of these isotopic forms of water may be achieved by processing through one or more cascade filtration units or modules, such as a reflux cascade. In addition, one or more modules may be configured to separate light and heavy water in either the gaseous or the liquid phase. Some embodiments may be configured to employ modules that filter heavy and/or super heavy water using graphene oxide membranes in the gaseous phase, and other modules in the same system that filter heavy and/or super heavy water in the liquid phase.

In certain preferred embodiments and implementations, heat may be added to transform the water into a gaseous phase and this water vapor may be passed through a filtration system, as described below, in order to separate/filter heavy water and/or super heavy water from light water vapor. For example, in some embodiments and implementations, a thermal pretreatment step/module may be used to vaporize the liquid water. In some such embodiments and implementations, a conventional evaporator may be utilized for this purpose. However, in other embodiments and implementations, the thermal efficiency of the process may be improved by implementing mechanical vapor recompression (MVR).

In some such embodiments and implementations, gaseous effluents from one or more separation steps may be directed to blowers/compressors, which may increase the pressure, and consequently the condensation temperature, of the vapors. The vapors may then be directed to heat exchangers to supply sensible heat and latent heat of vaporization to the liquid feed. The use of MVR evaporation may also serve as a pretreatment to the gaseous phase separation process in that it may remove contaminants that could adversely affect the separation process. MVR may also be used as a thermally-efficient pretreatment step to provide a clean distillate to the liquid phase separation process.

Further details of certain examples of embodiments of methods and systems according to the present disclosure will now be provided in conjunction with the accompanying drawings. FIG. 1 depicts an embodiment of a system 100 for separating one or more isotopic forms of water from one or more other isotopic forms of water. System 100 comprises a cascade filtration system comprising four filtration modules—filtration modules 110, 120, 130, and 140. Each of the filtration modules comprises at least one graphene oxide membrane, namely, filtration module 110 comprises graphene oxide membrane 112, filtration module 120 comprises graphene oxide membrane 122, filtration module 130 comprises graphene oxide membrane 132, and filtration module 140 comprises graphene oxide membrane 142.

Of course, as those of ordinary skill in the art will appreciate, each of the modules may comprise multiple graphene oxide membranes. In addition, other membranes and/or filtration technology may be incorporated into one or more of modules 110-140, and/or water being fed through modules 110-140 may pass through other filters, filtration modules, or the like, either before or after being fed into cascade filtration system 100. In addition, any number of modules may be used in alternative embodiments as desired. In some embodiments, for example, a single filtration module may be used that may, in some embodiments, comprise a single graphene oxide membrane.

One or more of the modules depicted and described herein may, in some embodiments, comprise graphene oxide membranes comprising a plurality of sheets of graphene oxide. Such sheets may be layered together if desired to form a single membrane. For example, in some embodiments, graphene oxide laminates may be used, which may be formed as a collection of micron-sized crystallites of graphene oxide that form a layered, interlocked structure comprising a membrane.

In some embodiments, one or more such membranes may comprise a thickness of between about 0.1 micrometers to about 10 micrometers. In some such embodiments, one or more such membranes may comprise a thickness of between about 0.2 and about 6 micrometers. In some such embodiments, one or more such membranes may comprise a thickness of between about 0.3 and about 1 micrometer. In some such embodiments, one or more such membranes may comprise a thickness of about 0.5 micrometers.

In some embodiments comprising layered graphene oxide sheets, such as graphene oxide laminate membranes, the sheets may be laminated so as to be separated from each adjacent sheet by a distance of from about 0.5 nanometers to about 2 nanometers. In some such embodiments, the sheets may be laminated so as to be separated from each adjacent sheet by a distance of about 1 nanometer. In some embodiments, the sheets may be laminated so as to be separated from each adjacent sheet by a distance of at least about 0.6 nanometers.

However, it has been shown that humidity and/or partial pressures of water may play a role in altering the interlayer spacing of certain layered graphene oxide membranes. As such, some embodiments may be configured to maintain a particular humidity and/or water partial pressure within the system or at least one of the filtration modules of the system.

For example, some embodiments may be configured with one or more modules that are configured to maintain a partial pressure of water inside the filtration portion of the module of at least about 10 mbar. Some such embodiments may be configured with one or more modules that are configured to maintain a partial pressure of water inside the filtration portion of the module of at least about 15 mbar.

In addition, some embodiments may be configured with one or more modules that are configured to maintain a relative humidity within the filtration portion of the module of at least about 20%. Some such embodiments may be configured with one or more modules that are configured to maintain a relative humidity within the filtration portion of the module of at least about 30%. Some such embodiments may be configured with one or more modules that are configured to maintain a relative humidity within the filtration portion of the module of at least about 50%. However, other embodiments are contemplated in which it may be desirable to maintain a lower humidity, for example a humidity less than about 50%, or less than about 30%, in order to reduce the relative spacing between sheets. Although such graphene oxide membranes may not allow for passage of light water as easily through the membranes, they may make it more difficult for heavy and/or super heavy water to pass through the membrane to increase the efficacy of the filtration.

In some embodiments, the relative humidities and/or partial pressures of water may vary within the system to take advantage of the differences in heavy water penetration associated with differing humidities and/or partial pressures of water. The thicknesses of the membranes and/or spacing between sheets in multi-layered graphene oxide membranes may also vary between modules in the same filtration system for similar reasons. For example, one or more filtration modules in a heavy water filtration system may be configured with a graphene oxide membrane having certain characteristics or parameters—such as thickness, interlayer spacing, humidity, etc.—that are more specifically configured to selectively filter super heavy water and one or more other filtration modules may be configured with a graphene oxide membrane having certain characteristics or parameters that are better configured to selectively filter heavy water.

One or more of the graphene oxide laminates or membranes disclosed herein may be made by obtaining graphite oxide dispersed in (light) water. Such graphite oxide may be dispersed in water by, for example, sonication in order to create a stable suspension of graphene oxide crystallites. This suspension may then be used to produce laminates by, for example, spray coating and/or spin coating. In some implementations of such methods, the substance may be applied to a substrate, such as silicon dioxide, glass, silicon nitride deposited on a silicon wafer, or plastics.

One or more of the modules depicted and described herein may, in some embodiments, comprise multiple graphene oxide membranes. Such membranes may be stacked or otherwise be arranged together in a manner to more effectively filter water according to its various isotopic forms.

Alternatively, or additionally, one or more graphene oxide membranes may be configured into tubes and used in a cross-flow filtration configuration. Other cross-flow filtration modules, devices, or systems, may also be included in the system so as to, for example, allow for effective filtration of other substances. Other water treatment processes may also be incorporated into the system as needed according to the industry and/or application.

Returning to the specific embodiment depicted in FIG. 1, a stream, such as a waste stream of water from a nuclear power plant, for example, may be fed into the graphene oxide filtration system 100 at filtration module 110 and passed through a graphene oxide membrane 112. In some embodiments, the liquid stream may first be converted to a gaseous stream by heating the liquid water before passing it through one or more such filtration modules.

The permeate, which should contain a lower concentration of heavy and/or super heavy water, is then passed to a second filtration module 120 comprising a second graphene oxide membrane 122. Again, the permeate is passed along to a third filtration module 130 comprising a third graphene oxide membrane 132, after which the resulting permeate is passed along to another, fourth filtration module 140 comprising another graphene oxide membrane 142. Of course, fewer or greater number of modules may be used in alternative embodiments.

The final permeate comprising light water, or at least a reduced concentration of heavy and/or super heavy water, may then be released into the environment, as indicated by the "Out Light" label in FIG. 1. Of course, the final permeate may instead be stored for reuse, fed into secondary filtration and/or treatment systems, or otherwise directed as desired.

The retentate from each of modules 110-140, which may contain a higher concentration of heavy and/or super heavy water, may be directed out of system 100 as indicated by the "Out Heavy" label in FIG. 1. This retentate may be stored for disposal, directed to other treatment modules, or stored for other uses, such as for resale.

Some embodiments may be configured to reflux one or both of the retentate and the permeate in a reflux cascade filtration system. For example, the filtration system 200 depicted in FIG. 2 comprises a reflux cascade system. Reflux cascade system 200 comprises a first filtration module 210 comprising a graphene oxide membrane 212 and a second filtration module 220 also comprising a graphene oxide membrane 222.

Figure 2:
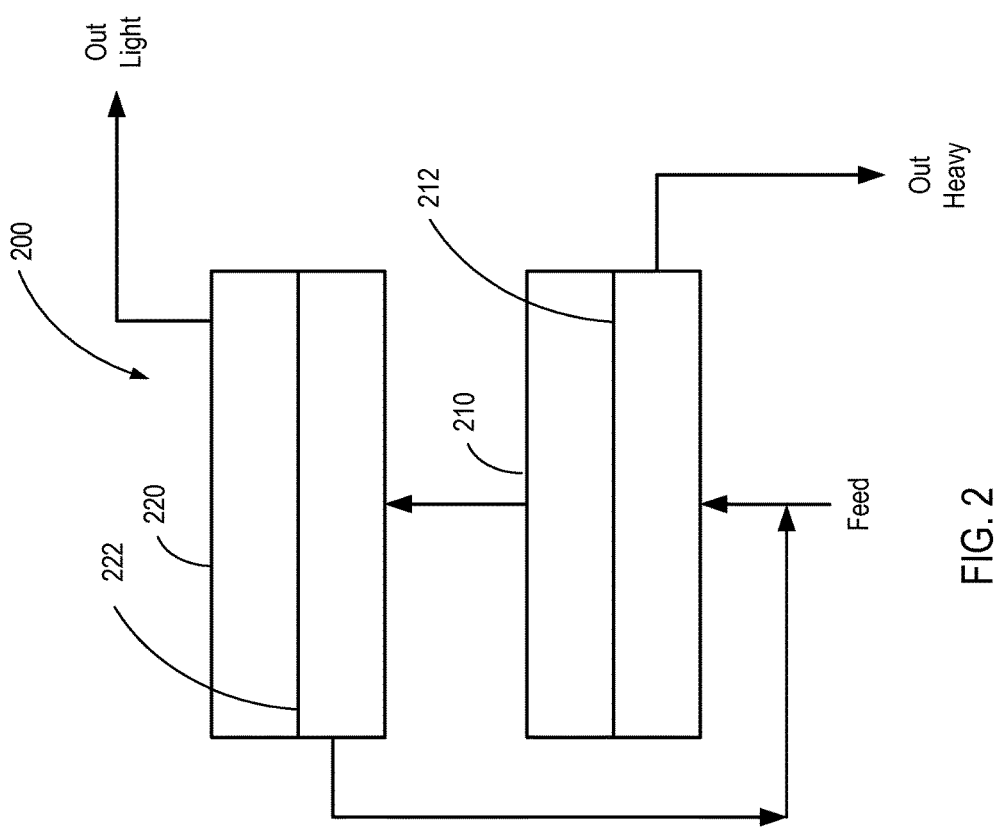
FIG. 2 depicts an alternative embodiment of a system for separating one or more isotopic forms of water from one or more other isotopic forms of water using graphene oxide membranes.

As shown in the diagram of FIG. 2, a stream, such as a waste stream of water from a nuclear power plant, for example, may be fed into the graphene oxide filtration system 200 at filtration module 210 and passed through a graphene oxide membrane 212. The permeate from module 210, which should contain a lower concentration of heavy and/or super heavy water, may be fed to filtration module 220 and through graphene oxide membrane 222. The retentate from module 210, which may contain a higher concentration of heavy and/or super heavy water, may be directed out of system 200 as indicated by the "Out Heavy" label in FIG. 2. The retentate from module 220 may be directed to filtration module 210, and again through graphene oxide membrane 212.

The permeate comprising light water, or at least a reduced concentration of heavy and/or super heavy water, from module 220 may be released into the environment, as indicated by the "Out Light" label in FIG. 2. Of course, this permeate may instead be stored for reuse, fed into secondary filtration and/or treatment systems, or otherwise directed as desired. As mentioned above, fewer or greater number of modules may be used in alternative embodiments, and alternative configurations of such modules may be apparent to those of ordinary skill in the art after having received the benefit of this disclosure.

Figure 3:
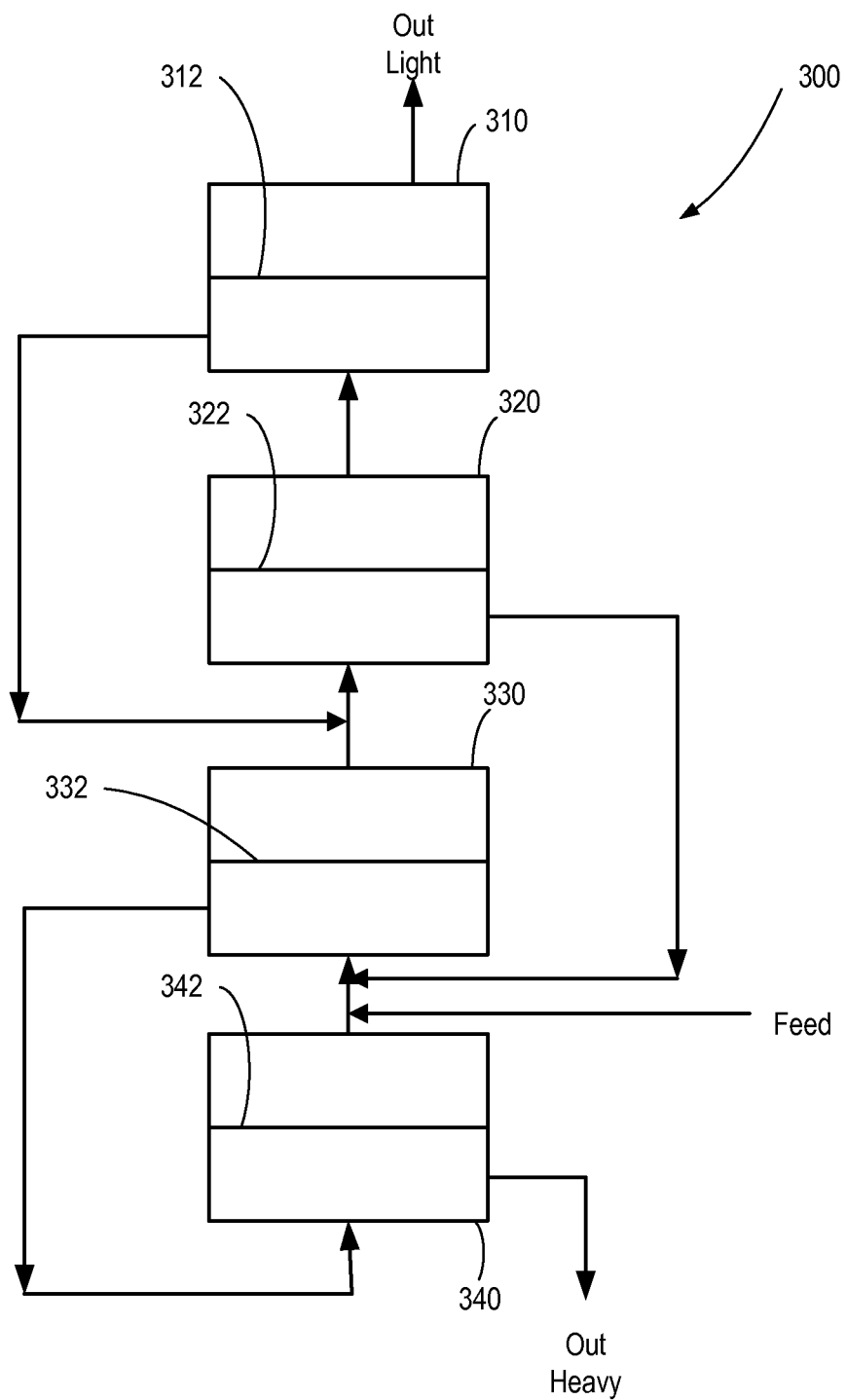
FIG. 3 depicts yet another embodiment of a system for separating one or more isotopic forms of water from one or more other isotopic forms of water using graphene oxide membranes.

Yet another example of a filtration system using graphene oxide membranes is depicted in FIG. 3 at 300. The filtration system 300 depicted in FIG. 3 also comprises a reflux cascade system. Reflux cascade system 300 comprises a first filtration module 310 comprising a graphene oxide membrane 312, a second filtration module 320 comprising a graphene oxide membrane 322, a third filtration module 330 comprising a graphene oxide membrane 332, and a fourth filtration module 340 comprising a graphene oxide membrane 342.

As shown in the diagram of FIG. 3, a stream, such as a waste stream of water from a nuclear power plant, for example, may be fed into the graphene oxide filtration system 300 at filtration module 330 and passed through a graphene oxide membrane 332. The retentate from module 330, which may contain a higher concentration of heavy and/or super heavy water, may be directed to adjacent filtration module 340, and through graphene oxide membrane 342. The retentate from module 340 may be directed out of system 300 as indicated by the "Out Heavy" label in FIG. 3.

The permeate from module 340, which should contain a lower concentration of heavy and/or super heavy water, may be fed back to filtration module 330 and again through graphene oxide membrane 332. Similarly, the permeate from module 330 may be fed to filtration module 320 and through graphene oxide membrane 322. The retentate from module 320, which may contain a higher concentration of heavy and/or super heavy water, may be directed to adjacent filtration module 330 adjacent to the feed line and through graphene oxide membrane 332. And, likewise, the permeate from module 320 may be fed to filtration module 310 and through graphene oxide membrane 312.

The retentate from module 310, which may contain a higher concentration of heavy and/or super heavy water, may be directed to adjacent filtration module 320, and through graphene oxide membrane 322. The permeate comprising light water, or at least a reduced concentration of heavy and/or super heavy water, from module 310 may be released into the environment, as indicated by the "Out Light" label in FIG. 3. Of course, this permeate may instead be stored for reuse, fed into secondary filtration and/or treatment systems, or otherwise directed as desired. As also mentioned above, fewer or greater number of modules may be used in alternative embodiments, and alternative configurations of such modules may be apparent to those of ordinary skill in the art after having received the benefit of this disclosure.

It will be understood by those having skill in the art that changes may be made to the details of the above-described embodiments without departing from the underlying principles presented herein. For example, any suitable combination of various embodiments, or the features thereof, is contemplated.

Throughout this specification, any reference to "one embodiment/implementation," "an embodiment/implementation," or "the embodiment/implementation" means that a particular feature, structure, or characteristic described in connection with that embodiment/implementation is included in at least one embodiment/implementation. Thus, the quoted phrases, or variations thereof, as recited throughout this specification are not necessarily all referring to the same embodiment/implementation.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. Accordingly, this disclosure is to be regarded in an illustrative rather than a restrictive sense, and all such modifications are intended to be included within the scope thereof.

Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element.

It should be further understood that the method steps and/or actions described herein may be interchanged with one another. In other words, unless a specific order of steps or actions is explicitly required for proper operation of the embodiment, the order and/or use of specific steps and/or actions may be modified. In addition, it should be understood that other implementations of such methods need not necessarily include each of the recited steps, and further that certain steps from certain implementations disclosed herein may be interchanged with other implementations, as those of ordinary skill in the art would appreciate.

It will be apparent to those having skill in the art that changes may be made to the details of the above-described embodiments without departing from the underlying principles set forth herein. The scope of the present invention should, therefore, be determined only by the following claims.

The invention claimed is:

1. A filtration system for filtering nuclear wastewater, comprising:
   a filtration module comprising a graphene oxide membrane;
   an intake positioned in fluid communication with the filtration module;
   an outlet positioned in fluid communication with the filtration module;
   waste water from a nuclear power plant positioned in the intake, the waste water having a first concentration of at least one of heavy water or super heavy water;

permeate positioned in the outlet, the permeate having a second concentration of at least one of heavy water or super heavy water that is lower than the first concentration.

2. The system of claim 1, comprising a plurality of filtration modules, wherein each of the plurality of filtration modules comprises a graphene oxide membrane.

3. The system of claim 2, wherein each of the graphene oxide membranes comprises a plurality of graphene oxide sheets.

4. The system of claim 3, wherein the plurality of graphene oxide sheets are coupled together in a layered, interlocking structure.

5. The system of claim 1, wherein the graphene oxide membrane comprises a plurality of graphene oxide sheets.

6. The system of claim 5, wherein each of the plurality of graphene oxide sheets is separated from an adjacent graphene oxide sheet by a distance of about 0.5 nanometers to about 2 nanometers.

7. The system of claim 1, wherein the graphene oxide membrane has a thickness of about 0.1 micrometers to about 10 micrometers.

8. The system of claim 1, wherein the graphene oxide membrane has a thickness of about 0.3 micrometers to about 1 micrometer.

9. The system of claim 1, wherein the second concentration is at least substantially zero.

10. The system of claim 2, wherein the plurality of filtration modules comprises a reflux cascade filtration system.

11. The system of claim 1, wherein the waste water is a liquid, the system further comprising a thermal pretreatment module positioned before the filtration module, the thermal pretreatment module being configured to receive the liquid waste water from the intake, convert at least a portion of the liquid waste water into gaseous water, and output the gaseous water to the filtration module.

12. The system of claim 11, wherein the thermal pretreatment module comprises a mechanical vapor recompression module.

13. The system of claim 1, wherein the filtration module comprises a pressure module configured to maintain a partial pressure of water within at least a portion of the filtration module at at least about 10 mbar.

14. The system of claim 13, wherein the pressure module is configured to maintain a partial pressure of water within at least a portion of the filtration module at at least about 15 mbar.

15. The system of claim 2, wherein each of the plurality of filtration modules comprises a pressure module configured to maintain a partial pressure of water within each of the plurality of filtration modules at at least about 10 mbar.

16. The system of claim 1, wherein the outlet is a first outlet, the system further comprising a second outlet positioned in fluid communication with the filtration module and retentate positioned in the second outlet, the retentate having a third concentration of at least one of heavy water or super heavy water that is higher than the first concentration.

17. The system of claim 11, wherein the graphene oxide membrane comprises a plurality of graphene oxide sheets.

18. The system of claim 11, wherein the graphene oxide membrane comprises a plurality of graphene oxide sheets coupled together in a layered, interlocking structure.

19. The system of claim 11, wherein each of the plurality of graphene oxide sheets is separated from an adjacent graphene oxide sheet by a distance of about 0.5 nanometers to about 2 nanometers.

20. The system of claim 11, wherein the graphene oxide membrane comprises a thickness of about 0.1 micrometers to about 10 micrometers.

21. The system of claim 11, wherein the graphene oxide membrane comprises a thickness of about 0.3 micrometers to about 1 micrometer.

22. A nuclear power plant comprising the filtration system of claim 1.

* * * * *